United States Patent [19]
Randolph, Jr. et al.

[11] Patent Number: 5,309,646
[45] Date of Patent: May 10, 1994

[54] TOOL POINT COMPENSATION FOR HARDWARE DISPLACEMENT AND INCLINATION

[75] Inventors: James E. Randolph, Jr., Wilmington, N.C.; R. David Hemmerle, Blue Ash, Ohio

[73] Assignee: General Electric Company, Cincinnati, Ohio

[21] Appl. No.: 38,758

[22] Filed: Mar. 29, 1993

Related U.S. Application Data

[63] Continuation of Ser. No. 801,335, Dec. 2, 1991, abandoned.

[51] Int. Cl.$^5$ ................................................ G01B 5/02
[52] U.S. Cl. .................................... 33/502; 33/503; 33/554; 33/645; 364/474.18
[58] Field of Search ............... 364/474.18, 474.37, 364/474.35, 551.02

[56] References Cited

U.S. PATENT DOCUMENTS

| | | | |
|---|---|---|---|
| 3,492,467 | 1/1970 | Caban et al. | 235/151.11 |
| 3,684,874 | 8/1972 | Kelling | 235/151.11 |
| 3,839,800 | 10/1974 | Bederman et al. | 33/505 |
| 3,866,829 | 2/1975 | Egawa et al. | 33/550 |
| 4,541,054 | 9/1985 | Peck et al. | 364/474 |
| 4,642,902 | 2/1987 | Niedermayr | 33/550 |
| 4,807,152 | 2/1989 | Lane et al. | 33/503 |
| 4,879,664 | 11/1989 | Suyama et al. | 364/518 |
| 4,942,611 | 7/1990 | Kunugi et al. | 364/474.18 X |
| 5,204,824 | 4/1993 | Fujimaki | 33/503 |

FOREIGN PATENT DOCUMENTS

| | | | |
|---|---|---|---|
| 0275428 | 7/1988 | European Pat. Off. | 33/502 |
| 0120109 | 7/1983 | Japan | 33/553 |
| 2039050 | 7/1980 | United Kingdom | 33/504 |

OTHER PUBLICATIONS

"Mark Century 2000", Computer Numerical Control, Part Programming Manual, 2000 MC CNC, GEK 25384, General Electric, Dec., 1985.

Primary Examiner—William A. Cuchlinski, Jr.
Assistant Examiner—Alvin Wirthlin
Attorney, Agent, or Firm—Jerome C. Squillaro; Charles L. Moore, Jr.

[57] ABSTRACT

The invention provides a system, method, and computer program for automatically evaluating the linear displacement and inclination of the centerline of a piece of hardware to be machined on a computer numerically controlled (CNC) machine relative to an axis of rotation of the machine about which the hardware will be rotated. The invention also provides a compensation for correcting for any hardware axis misalignment.

5 Claims, 5 Drawing Sheets

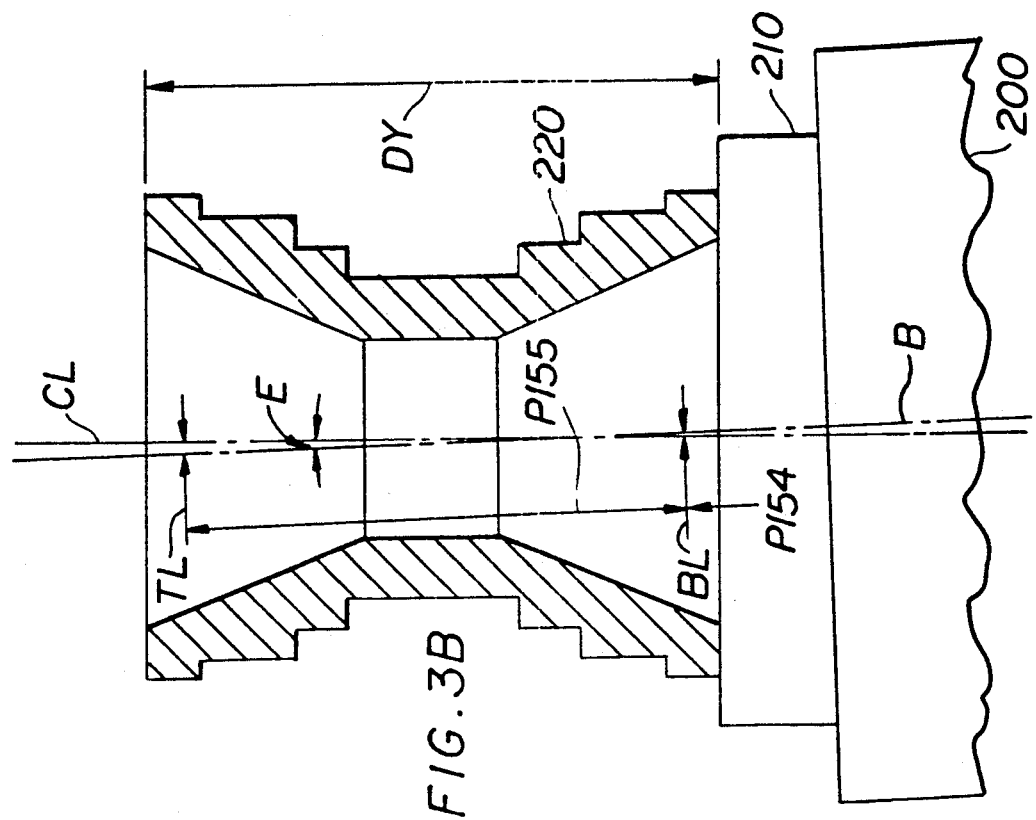
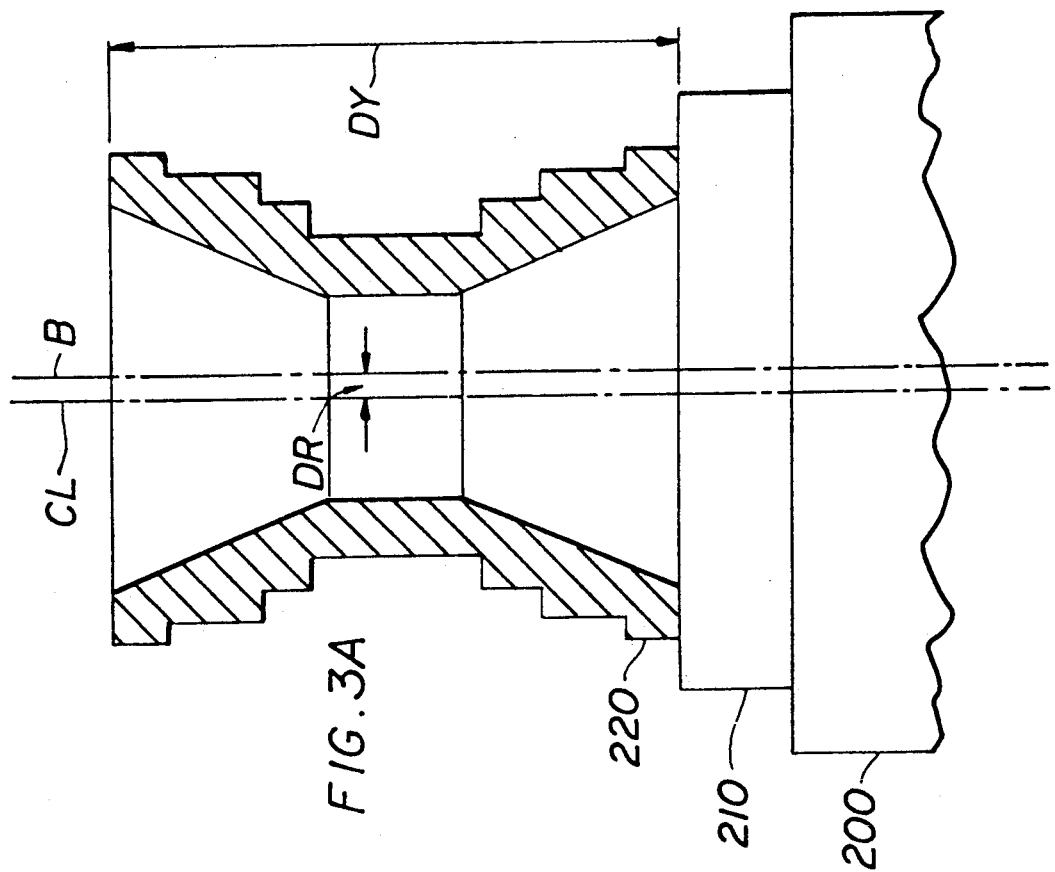

TOOL POINT COMPENSATION FOR HARDWARE DISPLACEMENT AND INCLINATION

This application is a continuation of application Ser. No. 07/801,335, filed Dec. 2, 1991, now abandoned.

BACKGROUND OF THE INVENTION

1. Field of the Invention

The invention relates to multi-degree of freedom of motion rotary tool machines for machining hardware mounted on a rotatable tabletop and in particular to automatically evaluating the inclination and linear displacement alignment of the hardware centerline to a reference axis of rotation of the machine and calculating respective compensations for accurate machining.

2. Description of Related Art

Computer numerically controlled (CNC) machines are able to accurately machine and produce hardware with tolerances on the order of three one thousandths of an inch (0.003″). Methods and apparatuses are conventionally available to manually evaluate CNC machine component alignment. Automatic tool length compensation is also available to to compensate for tool lengths and diameters. Many CNC machines have rotatable tabletops for holding hardware during machining. Such machines are often used in automated workplaces where automated guide vehicles shuttle hardware mounted on pallets from machine to machine or to different machine cells for various machining operations such as in automated flexible manufacturing systems.

Conventionally, a piece of hardware is loaded in a fixture, for use on a pallet, and is moved into final position using a mallet and dial indicator. Positioning the hardware in the fixture in this manner is done to achieve a desired concentricity. This can sometimes require the loosening and resetting of the hardware. This method can not correct for inclinational errors observed as varying eccentricities at different heights on the hardware. In addition, the pallet registration system on multiple work stations in an automated flexible manufacturing system, can not be maintained to the consistency required for pallet interchangeability. Manual realignment of a set-up, each time it is assigned to a different work station, is not practical in this environment.

It is therefore highly desirable to have a machining technique that provides a way to automatically machine hardware that is loaded in a fixture without operator intervention to manually position the hardware.

SUMMARY OF THE INVENTION

The present invention provides a system and method for automatically, accurately, and repeatably evaluating geometric conditions of hardware mounted in a fixture on a pallet of a computer numerically controlled (CNC) machine with respect to various degrees of freedom of motion of the hardware.

The present invention provides a computing means for a CNC machine having a spindle mounted probe to measure relative positions of hardware mounted on a rotatable mount to evaluate the hardware's condition with respect to a linear displacement and inclination of its axis relative to the axis of the rotatable mount. The present invention provides on apparatus, method, and a computer program in the form of machine readable instructions stored on machine readable media for a CNC machine. It can be employed on multi axis machine tools with a rotary axis, such as CNC drills, mills, and machining centers. The preferred embodiment of the present invention provides a machine's control with a computing means to perform the calculations for evaluating the hardware's condition and machine axis offsets from the evaluated conditions, and then to automatically adjust the machine axis offsets based on these calculations.

Hardware condition evaluation is provided by a computerized control means to direct spindle mounted probes to measure at least two different positions of hardware and use the measured positions to calculate the geometric alignment of the hardware with respect to a degree of freedom of motion of the hardware.

BRIEF DESCRIPTION OF THE DRAWINGS

The foregoing aspects and other features of the invention are explained in the following description, taken in connection with the accompanying drawing where:

FIG. 3a is a sideways diagrammatic cross-sectional view of the hardware in FIG. 2 showing only offset of axis.

FIG. 3b is a sideways diagrammatic cross-sectional view of the hardware in FIG. 2 showing only skew of axis.

DETAILED DESCRIPTION OF THE INVENTION

Figure 1:
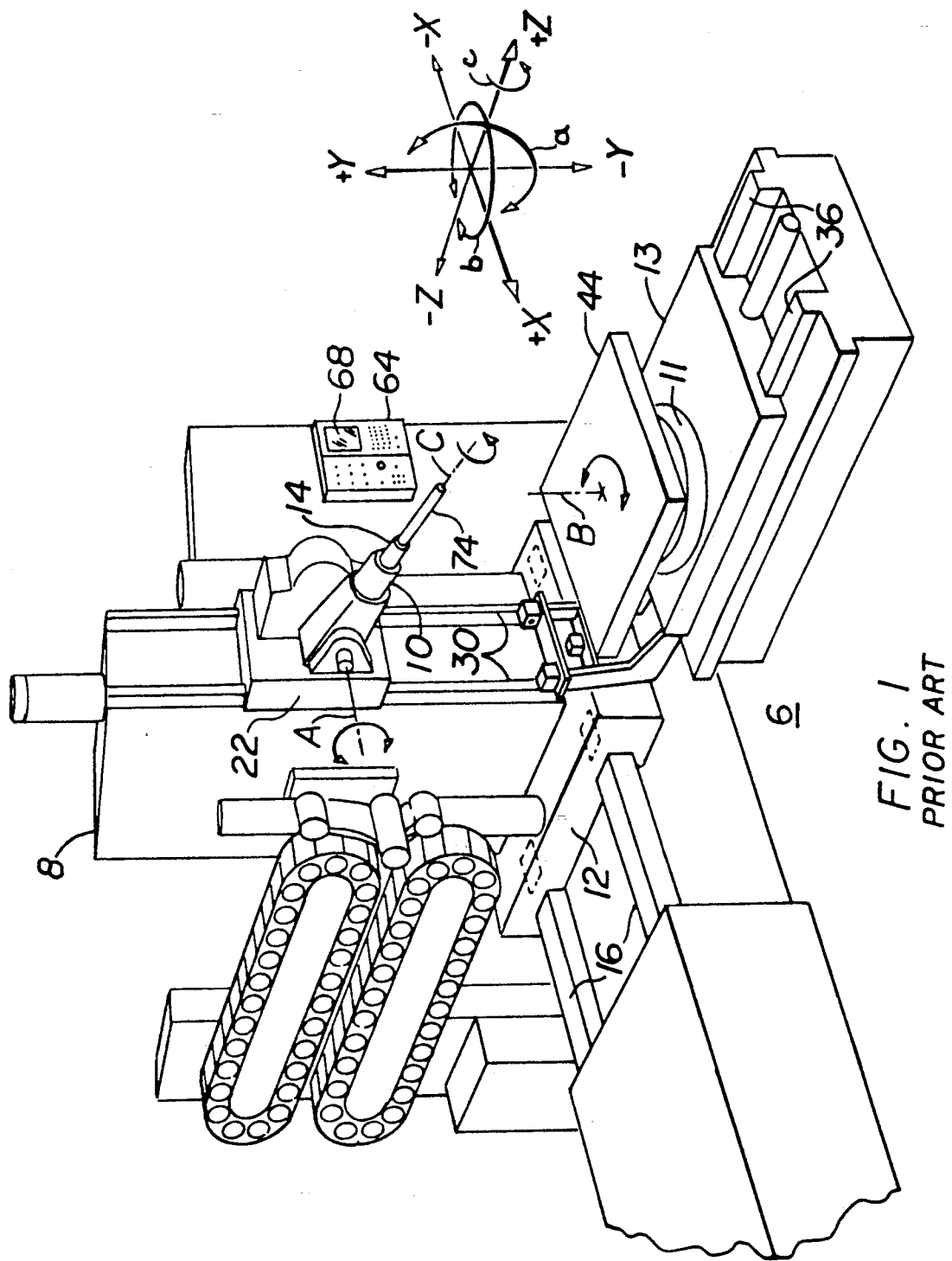
FIG. 1 is a perspective view illustrating a CNC machine including a reference coordinate system in accordance with the preferred embodiment of the present invention.

Illustrated in FIG. 1 is a computer numerically controlled (CNC) machine 6 of the 5-axis multi-purpose milling, drilling, and boring machine type such as the T-30 manufactured by Cincinnati Milacron. CNC machine 6 is generally constructed about a column 8 mounted on a linearly movable machine base 12 slidably resting on horizontal X direction quideways 16 parallel to the X axis. CNC machine 6 functions to position, power, and control a spindle mechanism 10 relative to a positionable work table 11. Powered by the machine's motor (not shown), spindle mechanism 10 includes a tool holder 14 adapted for receiving and retaining various cutting tools, measuring devices, and probes used in the machining process.

CNC machine 6 provides a means to move spindle mechanism 10, while it is spinning a tool mounted in its tool holder 14, relative to a piece of hardware 220 (shown in FIG. 2) mounted at a particular position on a work table 11. Relative positioning between work piece and spinning spindle mechanism 10 is done along 3 linear motion axes X, Y, and Z and about two rotational axes, trunnion axis A and vertical table axis B as shown in the corresponding reference axis in FIG. 1.

CNC machine 6 has a spindle carrier 22 to which spindle mechanism 10 is trunnioned thereby allowing spindle mechanism 10 to be pivoted about trunnion axis A which is parallel to the Z axis at a trunnion angle a=0°. Spindle carrier 22 is slideably mounted to vertical or Y guideways 30, which in turn are mounted to column 8, to provide motion along the Y axis for spindle mechanism 10.

Horizontal Z direction guideways 36 slideably support work table 11 having a tabletop 44 rotatable about a vertical table axis B which, when properly aligned, is parallel to the Y axis. The present invention in its preferred embodiment is designed to be used for hardware mounted on a movable pallet 200 (shown in FIG. 2) which is removably mountable to tabletop 44 (which is also referred to as a clamp plate when adapted to secure a movable pallet).

Still referring to FIG. 1, an automatic tool changing mechanism 70 is provided for CNC machine 6, of a type commonly used in the industry, and is adapted to store a trigger probe 74 used in the present invention. Control of CNC machine is provided by a computerized controller 64 having a display 68 and generally mounted near or in the vicinity of column 8 and work table 11. Computerized controller 64, in accordance with the present invention, provides a computerized means to evaluate the geometric condition of the work piece and to calculate the tool point compensations to correct or adjust hardware misalignment during machining of the hardware. The machining tool, when installed in the tool holder 14, has a tool point distance which is conventionally measured from the trunnion axis A. Programs are loaded in a conventional manner using CNC tapes or direct numerical control (DNC) methodologies.

The present invention uses a probing technique explained in more detail in a related patent application, U.S. patent application Ser. No. 07/920,069, which is a continuation of Ser. No. 07/800,948, entitled "AUTOMATED MAINTENANCE SYSTEM FOR COMPUTER NUMERICALLY CONTROLLED MACHINES", by R. David Hemmerle et al, assigned to the same assignee, and incorporated herein by reference. The probing technique is well known to those skilled in the art and explained in programming manuals such as the "PART PROGRAMMING MANUAL 2000MC CNC" published in December, 1985 by the General Electric Company, and which is incorporated herein by reference.

Figure 2:
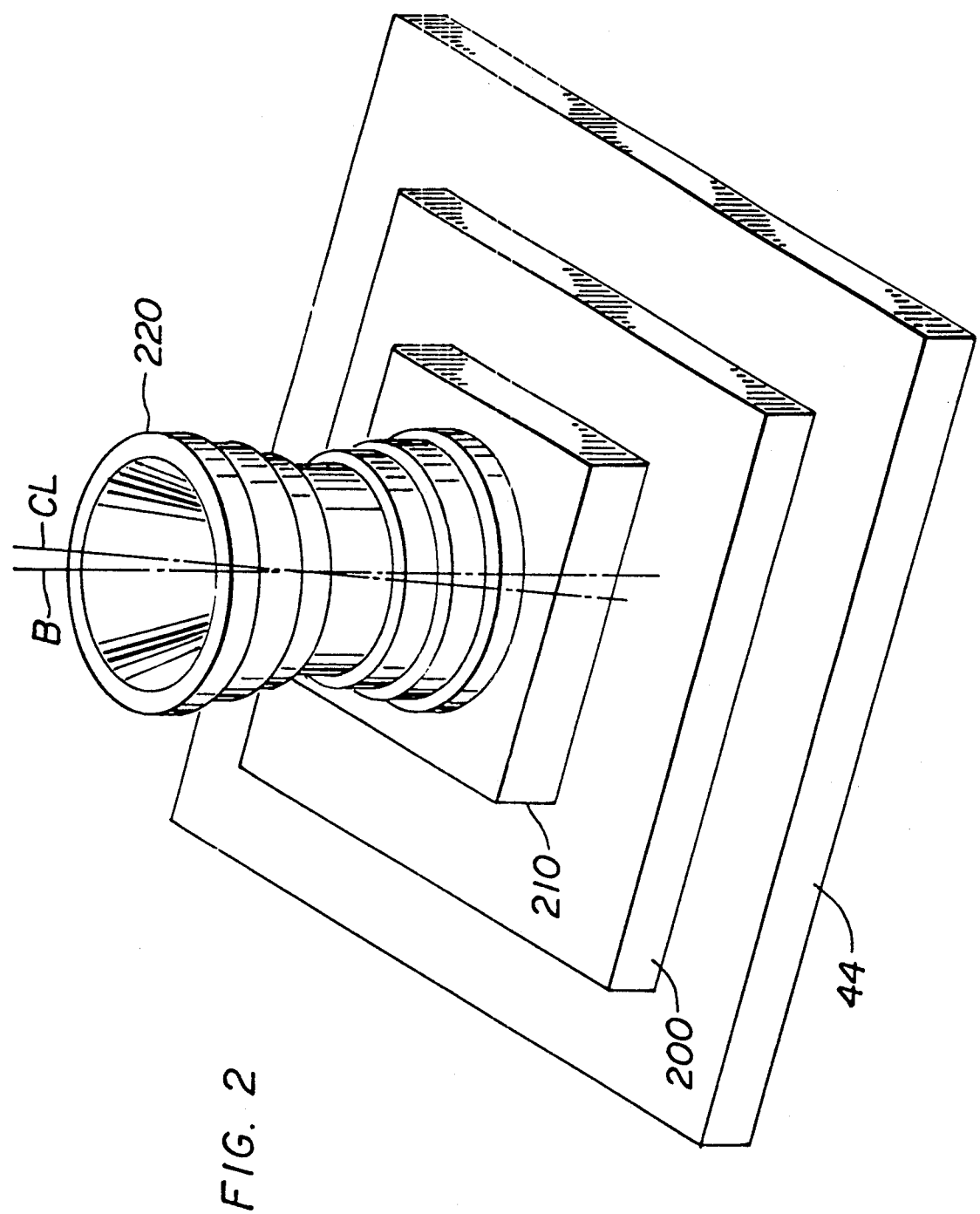
FIG. 2 is a perspective view illustrating hardware mounted on a rotatable tabletop of the CNC machine in FIG. 1.
Figure 5:
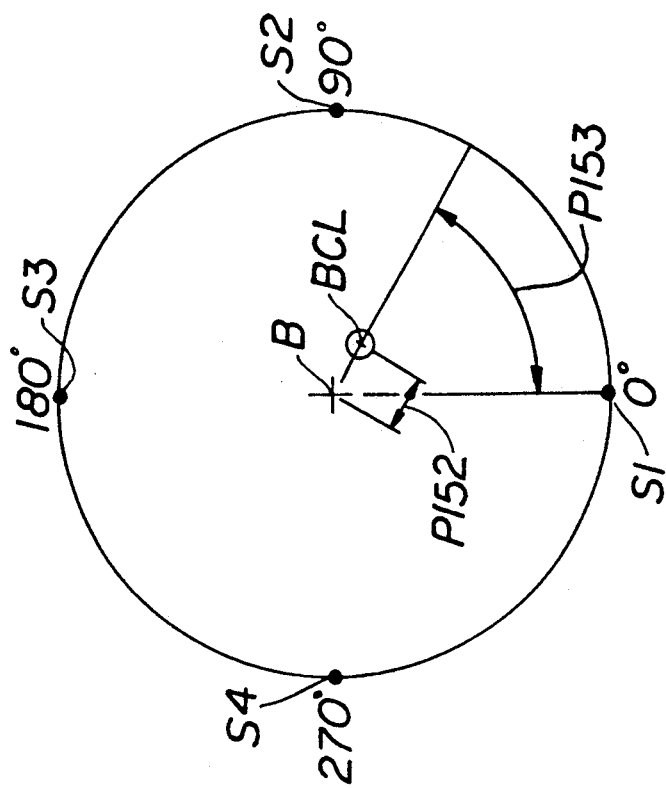
FIG. 5 is a top looking down diagrammatic cross-sectional view of the hardware in FIG. 2 taken at a lower location.

Illustrated in FIG. 2 is a movable pallet 200 having a fixture 210, for fixturing an annular hardware 220 such as a gas turbine engine case section, mounted on its top, and mountable to tabletop 44 in FIG. 1. The axis of rotation of pallet 200 is set to coincide with table axis B of machine 6 in FIG. 1. Referring back to FIG. 2, the present invention provides a means to probe an annular hardware 220 having hardware centerline CL that is both offset and skewed from the machining centerline of concern, table axis B, with a probe 74.

Illustrated in FIG. 3a is a degree or amplitude of the linear offset DR between table axis B and hardware centerline CL. The differences are exaggerated with respect to a hardware height DY for hardware 220 shown fixtured in fixture 210 mounted to pallet 220.

Illustrated in FIG. 3b is a degree or amplitude of the inclination as shown by an inclination angle E between table axis B and hardware centerline CL. Again for the purpose of illustration, the differences are exaggerated with respect to a hardware height DY for hardware 220 shown fixtured in fixture 210 mounted to pallet 220. Also shown are the axial top location TL and bottom location BL, whereby BL is at a position P154 on the table axis B and TL and BL are located a distance P155 apart along the B axis, at which hardware 220 is probed in accordance with the preferred embodiment of the present invention.

Figure 4:
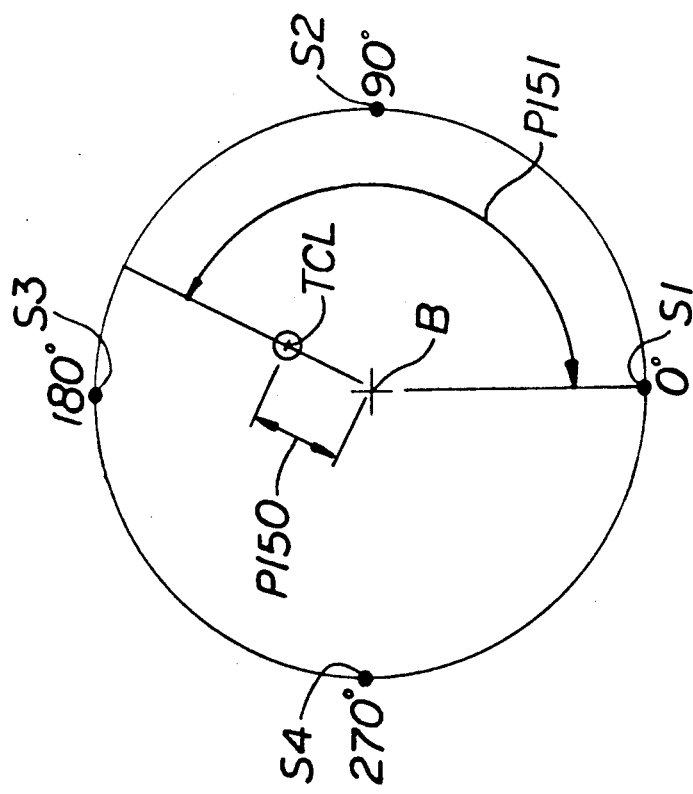
FIG. 4 is a top looking down diagrammatic cross-sectional view of the hardware in FIG. 2 taken at an upper location.

Referring to FIG. 4, the geometric condition of hardware centerline CL is evaluated by probing the side of annular hardware 220 with probe 74 at a top upper location (TL in FIG. 3b) at four circumferential stations S1, S2, S3, and S4 respectively located about machine rotatable table axis B at b=0°, 90°, 180°, and 270°. This allows the computing means to calculate a top amplitude of eccentricity P150 and a top angled direction of eccentricity P151 of a hardware centerline top center TCL as shown in FIGS. 4, 5, 6 and 7. The same is done for hardware centerline CL at a bottom or lower location (BL in FIG. 3b) located a distance P155 apart along the B axis to calculate a bottom amplitude of eccentricity P152 and a bottom angled direction of eccentricity P153 of a hardware centerline bottom center BCL as shown in FIGS. 4, 5, 6 and 7.

Figure 7:
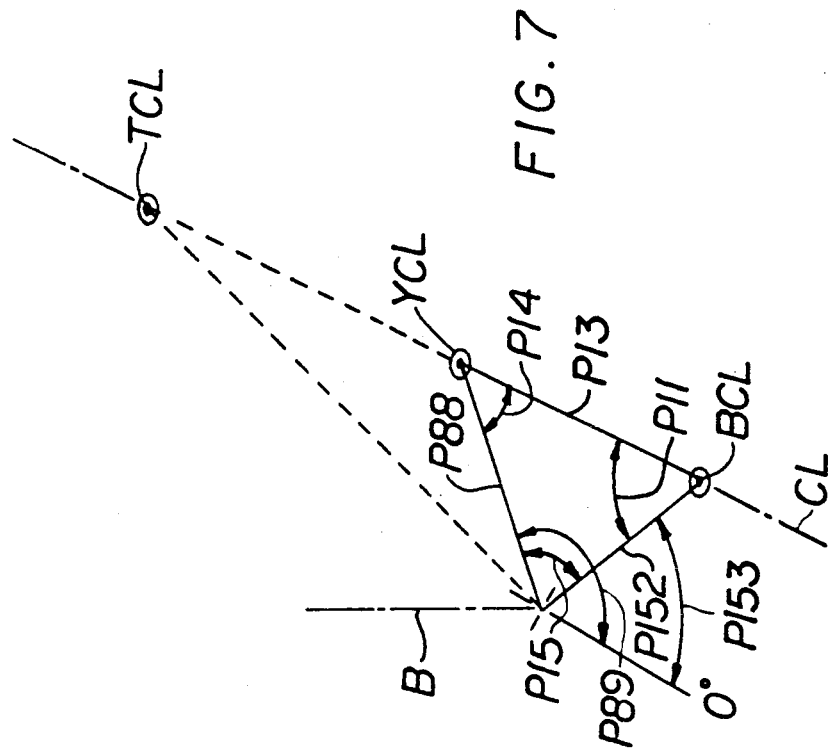
FIG. 7 is a diagrammatic perspective view representation of a vector diagram generally illustrating centerline offset calculations for machining at a Y coordinate of the hardware in FIG. 2.
Figure 6:
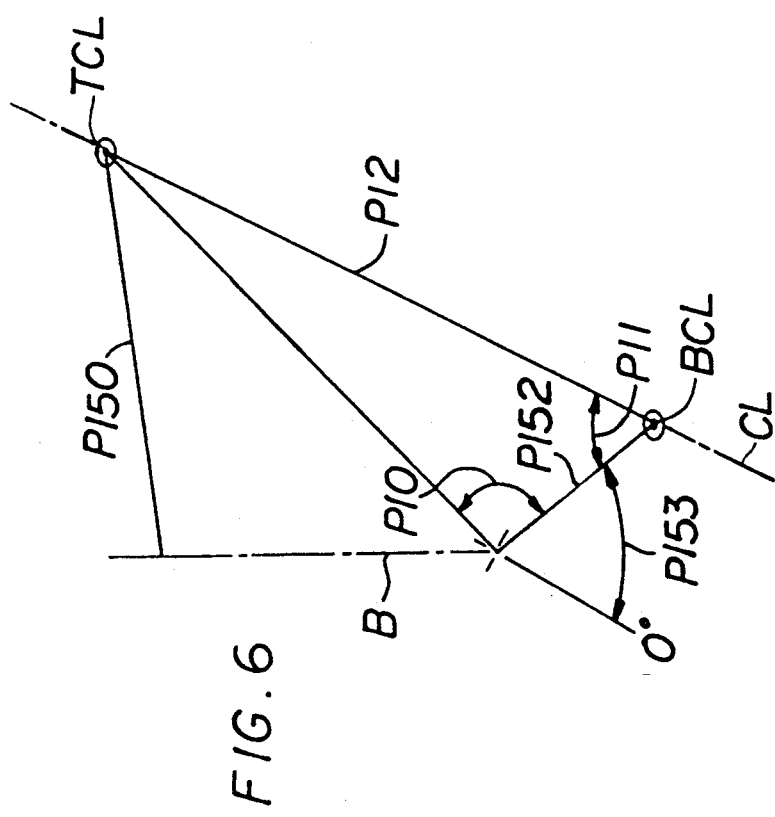
FIG. 6 is a diagrammatic perspective view representation of a vector diagram generally illustrating centerline locations of the hardware in FIG. 2.

Using the same reference frame as shown in FIG. 1 the top amplitude of eccentricity P150 is calculated, preferably in the computer means, by the trigonometric relationships illustrated in FIG. 4 where the P150 is the hypotenuse of the triangle formed by the legs of the X and Y displacement of the centerline CL from the axis B. The X displacement is the difference between the X coordinate at position S2 and the X coordinate at position S4 when the hardware is rotated 180 degrees from position S2. The Y displacement is the difference between the Y coordinate at position S3 and the Y coordinate at position S1 when the hardware is rotated 180 degrees from position S1. P150 is then the square root of the sum of the squares of the X displacement and the Y displacement. The top angled direction of eccentricity P151 of the hardware centerline top center TCL is therefore 180 degrees minus the arctangent of the Y displacement divided by the X displacement. The same calculations are done for P152 and P153 calculated above as shown in FIGS. 6 and 7. The same is done for hardware centerline CL at a bottom location (BL in FIG. 3b) located a distance P155 apart along the B axis to calculate a bottom amplitude of eccentricity P152 and a bottom angled direction of eccentricity P153 of a hardware centerline bottom center BCL as shown in FIGS. 6 and 7.

Using the parameters determined and calculated by probing, offsets or adjustments are geometrically generated as a function of a y machining coordinate along the Y axis of the machine such as in the following boldfaced CNC subrouting which is an NC code listing illustrating the preferred embodiment of offset calculation of the present invention and is subject to copyright protection. The geometric and vector relationships of the subrouting are shown in FIGS. 6 and 7 wherein YCL is the hardware centerline position for the Y machining coordinate.

The following terms are used in the exemplary subroutine below and their definitions are provided to assist in understanding the subroutine.

YCL—Is the center of the hardware at the Y height position that it is being machined.

P21—Is the length of the cutting tool extending from the face of the machine spindle as shown in FIG. 1.

P154—Is the absolute Y height position, relative to machine space, at which the base displacement and direction for the machining process were established.

P10—Is the angle difference between the angled direction of displacement at the base and the angled direction of displacement at the top.

P11—Is the angle difference between the angled direction of displacement at the base and the angled direction of the centerline CL.

P12—Is a distance between the center of the hardware at the base and the center of the hardware at the top.

P13—Is a distance between the YCL and the center of the hardware at the base.

P14—Is an angle calculated from angles P152 and P11 and distance P13 of the machining point along YCL. It is used in a calculation to establish P88 (described below).

P15—Is an angle between the direction of displacement of YCL and the direction of displacement of the hardware at the base. P15 is used in calculation to establish P89 (described below).

P88—Is the displacement of the center of the hardware, at the Y height position (YCL) that it is being machined, from the machine B-axis center of rotation.

P89—Is the angle direction of displacement of the hardware, at the Y height position (YCL) that it is being machined, relative to the machine B (rotary) axis zero position.

P88 & P89—Are used in the final calculation to establish the machine X & Z axis compensations based on the current machine's B (rotary) axis position.

The copyright owner has no objection to the facsimile reproduction by anyone of the patent document or the patent disclosure, as it appears in the Patent and Trademark Office patent file or records, but otherwise reserves all copyright rights whatsoever.

```
(ID,GSUB,RCOMP, DISPLACEMENT & INCLINATION
COMPENSATION)
P18=(PRGPSN(Y)+((P21)*(SIND(PRGPSN(A)))))
P10= (ABS(P151-P153))
(IF(P10)<>0 GOTO N020)
P89=(P153)
P88=(p152+(((P18-P154)/P155)*(P150-P152)))
(GOTO N160)
N020 (IF(P10)<180 GOTO N040)
P10= (360-(ABS(P151-P153)))
N040 P11= (ATAND((P150*(SIND(P10)))/(P152-
(P150*(COSD(P10))))))
P12= ((P150*(SIND(P10)))/(SIND(P11)))
P13= (((P18-P154)/P155)*P12)
P17= (P13-(P152*(COSD(P11))))
(IF(P17)<>0 GOTO N070)
P17 = .00001
N070 P14= (ATAND((P152*(SIND(P11)))/(P17)))
(IF(P14)>0 GOTO N090)
P14= (180+P14)
N090 P88= ((P152*(SIND(P11)))/(SIND(P14)))
P15= (180-(P11+P14))
P15= (P153+180-P151)
(IF(P16)<360 GOTO N130)
P16= (P16-360)
N130 (IF(P16)>0 GOTO N140)
P16= (P16+360)
N140 (IF(P16)<180 GOTO N150)
P15= (P15*-1)
N150 P89= (P153+P15)
N160 (STO,55,SOV(Y),0)
```

-continued
```
(STO,55,SOV(X),((SIND(P89-PRGPSN(B)))*P88))
(STO,55,SOV(Z),((COSD(P89-PRGPSN(B)))*P88))
G55
(END,GSUB)
```

The exemplary subroutine above uses values for input as shown in the FIGURES and computations as explained above. The language is standard and well known in the art and may be found in the GE Manual referenced above. The following definitions are provided to facilitate the understanding of the subroutine.

G55: Activate Setup Offsets No. 2

ABS(arg1): Computes the absolute value of arg1.

COSD(arg1): Computes the cosine of arg1 where arg1 is in degrees.

SIND(arg1): Computes the sine of arg1 where arg1 is in degrees

ATAND(arg1): Computes the inverse tangent of arg1 in degrees ($-90$ degrees $<=0<=90$ degrees)

SOV(axis): Setup Offset Value for the axis in ( )

STO: A Store Command

With the STOre command the part program can enter new data values into tables. The value in the STO command block replaces the data in the specified table entry.

EXAMPLE

N100 (STO, 54, SOV(X), 1.2)

This command stores 1.2 in the X setup offset number 54.

PRGPSN(axis): This function retrieves the program position for the axis letter in the parentheses. The position for only one axis at a time may be retrieved. It returns the axis absolute program position relative to program zero in program units (inch or metric for X, Y, and Z, degrees or radians for axis A and Axis B). The value is the axis position at the beginning of the block containing the PRGPSN function. This function may be called repeatedly to retrieve the position values for all axes.

P21 is the tool length as measured from the trunnion axis A as shown in FIG. 1. Y is the Y machining position of the tool and A is the trunnion angle A for the machining position of the tool as shown in FIG. 1. The subroutine calculates the setoff values for X and Z as a function of the Y machining position in accordance with the present invention and then stores the offsets in the second offset table 55 in a well known and conventional manner. The G55 command then activates the offsets stored in the second table.

While the embodiments of the present invention presented herein have been described fully in order to explain its principles, it is understood that various modifications or alterations may be made to the described embodiments without departing from the scope of the invention as set forth in the appended claims.

We claim:

1. A method for compensating for any linear displacement and inclination offset of a workpiece relative to an axis of rotation of a computer numerically controlled (CNC) machine, said method comprising the steps of:

(a) positioning the workpiece on a rotatable mount of the CNC machine with a centerline of the workpiece proximate to the axis of rotation of the CNC machine;

(b) contacting an upper portion of the workpiece on at least two different upper portion locations with a probe mounted in a tool holder of a spindle mechanism of the CNC machine;

(c) recording an upper coordinate position of each of the at least two different upper portion locations;

(d) contacting a lower portion of the workpiece on at least two different lower portion locations with the probe;

(e) recording a lower coordinate position of each of the at least two different lower portion locations;

(f) determining any linear displacement and inclination offset of the workpiece centerline relative to the axis of rotation of the CNC machine from the at least two upper coordinate positions and the at least two lower coordinate positions; and (g) adjusting the position of a machine tool point in response to any linear displacement and inclination offset with respect to said axis or rotation to compensate for the linear displacement or inclination offset during machining operation.

2. The method of claim 1, wherein step (f) comprises the steps of:

determining to top amplitude of eccentricity and a top angled direction of eccentricity of the workpiece centerline at a top of the workpiece; and determining a bottom amplitude of eccentricity and a bottom angled direction of eccentricity of the workpiece centerline at a bottom of the workpiece.

3. The method of claim 1, wherein step (g) comprise the step of determining the amount of any adjustment as a function of a coordinate associated with the machine axis of rotation.

4. The method of claim 1, wherein steps (b) and (d) each comprise the steps of contracting the workpiece with the probe at four equiangular positions around the workpiece.

5. A system to compensate for any linear displacement and inclination offset of a workpiece relative to an axis of rotation of a table of a computer numerically controlled (CNC) machine, said system comprising:

a movable pallet to position the workpiece on the rotatable CNC machine table with a centerline of the workpiece proximate to the axis of rotation of the CNC machine table;

a probe mounted in a tool holder of a spindle mechanism of the CNC machine;

means for causing said probe to contact the workpiece on at least two different locations on an upper portion of the workpiece and on at least two different locations on a lower portion of the workpiece;

means for recording an upper coordinate position of each of the at least two different upper portion locations and for recording a lower coordinate position of each of the at least two different lower portion locations;

means for determining any linear displacement and inclination offset of the workpiece centerline relative to the axis of rotation of the CNC machine table from the upper coordinate positions and the lower coordinate positions; and means for adjusting the position of a machine tool point in response to any linear displacement and inclination offset with respect to said axis of rotation to compensate for the linear displacement or inclination offset during a machining operation.

* * * * *